(12) United States Patent
Boone (10) Patent No.: US 7,627,079 B2
(45) Date of Patent: Dec. 1, 2009

(54) METHOD FOR COMPUTING PATIENT RADIATION DOSE IN COMPUTED TOMOGRAPHY

(75) Inventor: John M. Boone, Folsom, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 12/123,375

(22) Filed: May 19, 2008

(65) Prior Publication Data

US 2008/0292055 A1 Nov. 27, 2008

Related U.S. Application Data

(63) Continuation of application No. PCT/US2006/045303, filed on Nov. 21, 2006.

(60) Provisional application No. 60/738,704, filed on Nov. 21, 2005.

(51) Int. Cl.
*G01N 23/00* (2006.01)
(52) U.S. Cl. .............................. 378/4; 378/91; 378/210; 378/901
(58) Field of Classification Search .................... 378/4, 378/6, 91, 98, 98.2, 210, 901; 703/2
See application file for complete search history.

(56) References Cited

U.S. PATENT DOCUMENTS 5,400,378 A 3/1995 Toth
6,304,625 B1 10/2001 Senzig
6,636,622 B2 * 10/2003 Mackie et al. .............. 382/132
6,639,964 B2 10/2003 Schneider et al.
2003/0223627 A1 12/2003 Yoshida et al.
2004/0131141 A1 7/2004 Horiuchi
2004/0247071 A1 12/2004 Dafni

OTHER PUBLICATIONS

M.F. McNitt-Gray, AAPM/RSNA Physics Tutorial for Residents: Topics in CT in Radiographics Imaging and Therapeutic Technology, vol. 22, No. 6, pp. 1541-1553, Dec. 2002, downloaded Jun. 18, 2007 from <http://radiographics.rsnajnls.org/cgi/content/abstract/22/6/1541>.

* cited by examiner

*Primary Examiner*—Jurie Yun
(74) *Attorney, Agent, or Firm*—John P. O'Banion (57) ABSTRACT

A system and method are disclosed for computing a radiation dose delivered to a patient during a computed tomography (CT) scan of the patient. The CT image dataset generated during the scan of the patient, and one or more parameters relating to a x-ray source are used to calculate the radiation dose delivered to the patient as a function of the CT image data set and the one or more parameters of the x-ray source. The radiation dose is generally found by calculating a primary x-ray dose distribution and scattered x-ray dose distribution from the CT image dataset and taking the sum of the primary x-ray dose distribution and scattered x-ray dose distribution.

31 Claims, 9 Drawing Sheets

METHOD FOR COMPUTING PATIENT RADIATION DOSE IN COMPUTED TOMOGRAPHY

CROSS-REFERENCE TO RELATED APPLICATIONS

This application claims priority from, and is a 35 U.S.C. § 111(a) continuation of, co-pending PCT international application serial number PCT/US2006/045303, filed on Nov. 21, 2006, incorporated herein by reference in its entirety, which claims priority from U.S. provisional application Ser. No. 60/738,704, filed on Nov. 21, 2005, incorporated herein by reference in its entirety.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND OF THE INVENTION

1. Field of the Invention

This invention pertains generally to radiation dose computation and more particularly to radiation dose computation for CT imaging.

2. Description of Related Art

Computed Tomography (CT) is a medical imaging procedure which is performed millions of times each year in the United States. CT scans (formerly called CAT scans) allow physicians to look at images of the anatomy of the patient in individual "slices" or "sections". A modern CT scanner can produce upwards of 1,000 images of a patient's body part to be scanned, typically the head, thorax, abdomen, or pelvis.

Because of the enormous utility of computed tomography, CT has become the single largest contributor to radiation dose in the U.S. population. The radiation dose associated with computed tomography has always been of concern, however the increased use of CT across a broad spectrum of diagnostic situations coupled with the high output capabilities of modern CT scanners heightens these concerns.

Modern CT scanners have modes of operation which current CT dosimetry techniques do not and cannot address. In particular, the existence of both angular and z-axis mA modulation (discussed later) results in the output of a scanner being automatically changed during the actual scan, based on the patient's contour. Cylindrical Lucite phantoms are the current basis for the vast majority of CT dosimetry in the United States and beyond. These phantoms do not change in thickness as a function of either angle or z dimension, being homogenous polymethacrylate (PMMA) cylinders.

In addition to the inability to handle current scanner technology for accurate dosimetry, current CT dosimetry standards typically underestimate the radiation dose to the patient for a number of reasons. These reasons include the fact that most patients are not 32 cm in diameter, and patients' tissues have a density closer to 1.0 rather than the 1.19 gm/cm$^3$ density of PMMA. The thicker, denser dosimetry phantoms lead to an underestimate of the central radiation doses associated with most body CT procedures.

The radiation dose in CT comes from two sources: the primary radiation dose (the deposition of energy in tissues from x-ray photons which started their trajectory in the x-ray tube focal track) and from scattered radiation (x-rays which have been scattered within the patient, and are redistributed, contributing dose appreciably to tissues away from the original x-ray interaction point in the patient). Current dosimetry techniques for CT try to accommodate the scatter aspects of dose by using a long (100 mm) so-called pencil chamber which is exposed while placed in a hole in a PMMA cylinder. Unfortunately, at the high energies used in x-ray CT, the scattered radiation propagates to distances in the z dimension of the phantom farther than what the 100 mm pencil chamber can measure. This geometry therefore leads to an underestimate of the radiation dose due to CT.

Thus, for a number of reasons, it is clear that the methodology for computing radiation dose to patients in CT procedures needs significant improvement to obtain the accuracy necessary to make informed decisions about risk assessment, and whether a patient should have additional or continuing CT for other x-ray procedures.

Figure 1:
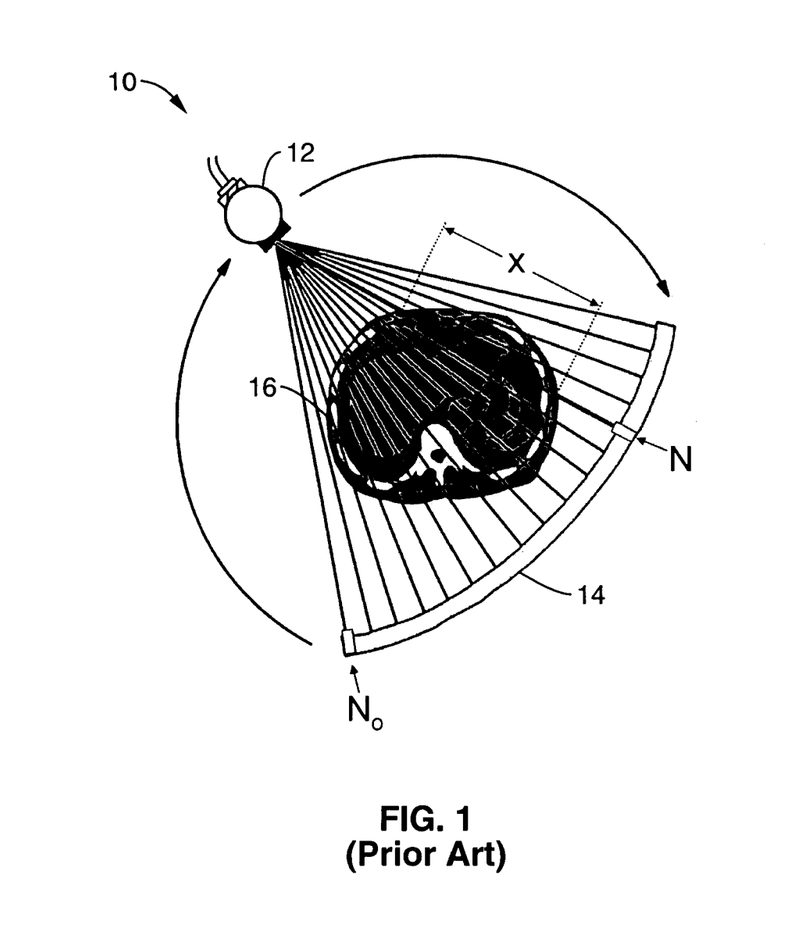
FIG. 1 is a schematic view of a typical CT scanner.

CT became a commercial product in the early 1970s, and since that time, the utility of the CT procedure has increased in importance with its growing capabilities and shorter scan times of CT scanners. A CT scanner acquires the raw data necessary for producing the CT images. As shown in FIG. 1, most modern CT scanners 10 have a x-ray tube 12 rotates in unison with the detector arrays 14 around the patient's body 16, emitting x-ray photons which interrogate the patient, and some of them emerge from the opposite side of the patient and strike the x-ray detector. The x-ray tube emits a number of photons per unit area (on the detector) $N_o$, but behind the patient, this value is reduced to N, due to x-ray attenuation from the patient's tissue. For a given path in the patient of distance X, the linear attenuation coefficient is computed by the scanner hardware using the following equation.

$$N = N_o e^{-\mu x} \qquad \text{Equation 1}$$

Where $\mu$ is the average linear attenuation coefficient of the patient along that path X.

Figure 2:
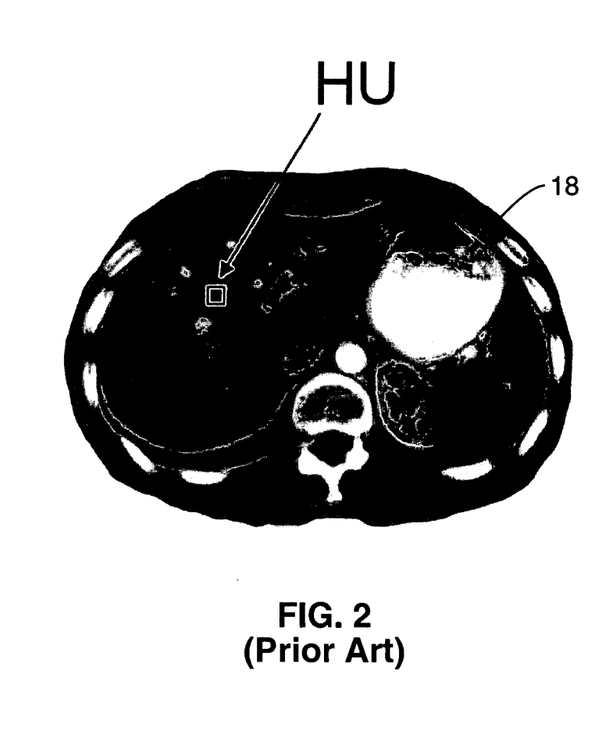
FIG. 2 illustrates an exemplary two-dimensional map of a CT image.

Once the CT acquisition is complete, the acquired data is pre-processed and then used to produce the CT images in a procedure known as filtered back projection. After the CT images are reconstructed, the images are re-scaled depictions (two dimensional maps 18 as shown in FIG. 2) of the linear attenuation coefficient (LAC) distribution in the patient. The rescaled values of the LAC are called Hounsfield Units (HU).

Once the CT images are produced from the filtered back projection, cone beam reconstruction, or iterative reconstruction procedure they comprise a volume data set which essentially digitizes the patient into millions of individual volume elements (voxels).

Figure 3:
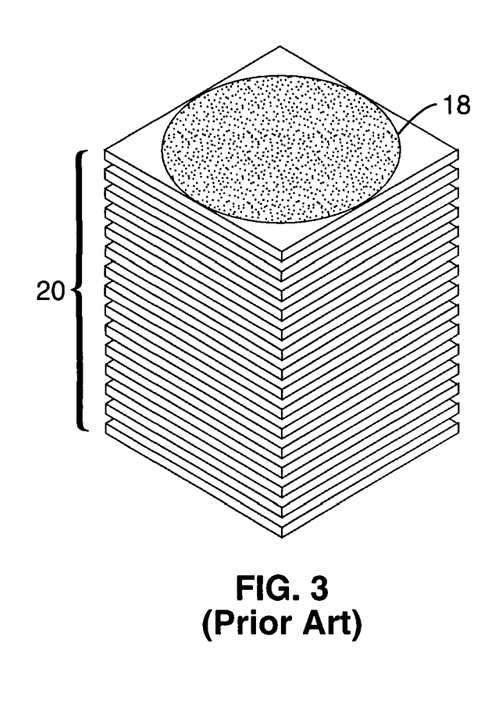
FIG. 3 is a schematic diagram of a CT volume data set.

Referring now to FIG. 3, CT scans are produced along a length of the patient's body, and a series of contiguous, or even overlapping, CT images 18 are produced to generate the volume data set 20. The series of images represents a map of the LAC of the patient, in three dimensions. The images are defined in the (x,y) plane, and the long axis of the scan is typically referred to as the z-axis. A series of axial images, which are acquired contiguously, form this volume data set. Thus, an (x,y,z) data set of linear attenuation coefficient values are the typical result of clinical CT scanning.

Each image in CT is a quantitative representation of the x-ray attenuation properties of an individual voxel in the patient. However, the CT scanner computer normalizes the reconstructed linear attenuation coefficient into a gray scale value of Hounsfield units (HU).

$$HU = 1000\frac{(\mu - \mu_w)}{\mu_w} \quad \text{Equation 2}$$

where HU is the Hounsfield Unit (gray scale of the CT image) of a given pixel in the image, $\mu$ is the linear attenuation coefficient (LAC) of the corresponding voxel in the patient, and $\mu_w$ is the linear attenuation coefficient of water for that scanner and for that x-ray beam.

A unique but key feature relative to the invention described here in CT is that the gray scale values (Hounsfield units) are quantitatively accurate descriptors of the x-ray attenuation properties of each voxel within the patient. The current method for computing x-ray dose to the patient relies upon this quantitative nature of the CT image data.

Figure 4:
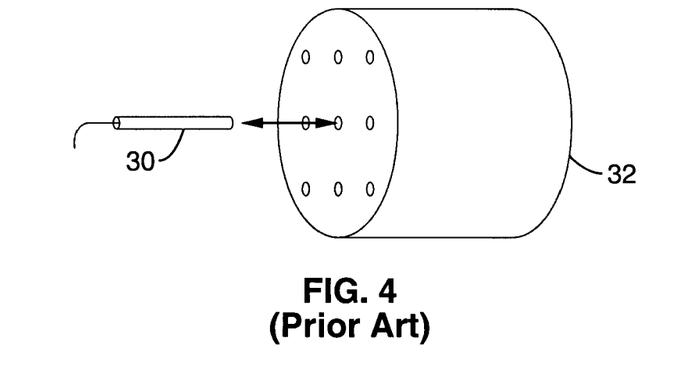
FIG. 4 illustrates a conventional technique for computing doses in CT.

Referring now to FIG. 4, to compute doses in CT, conventional techniques use a pencil chamber 30 (a long thin cylindrical ionization chamber) placed in various holes in a PMMA phantom 32. The phantom 32 is scanned in a CT scanner, and the dose received by the chamber is recorded.

The Computed Tomography Dose Index (CTDI) has been defined in the Code of Federal Regulations (21-CFR-1020.33), where:

$$CTDI = \frac{1}{nT}\int_{-7T}^{+7T} D(z)dz \quad \text{Equation 3}$$

and where:
z is the position along the z-axis of the scan or patient,
D(z) is the dose at position z,
T is the nominal tomographic section thickness, and
n is the number of images produced in a single scan.

This assumes that the scan increment (between images) is nT.

Due to the standard 100 mm length of the pencil chamber used almost worldwide for CT dosimetry, the $CTDI_{100mm}$ has been defined as:

$$CTDI_{100mm} = \frac{1}{nT}\int_{-50mm}^{+50mm} D(z)dz \quad \text{Equation 4}$$

The $CTDI_{100mm}$ is the basis for almost all CT dosimetry performed worldwide, with the exception of various research studies that use more sophisticated techniques such as MOSFET (metal oxide semiconductor field-effect transistor) dosimeters, thermoluminescent dosimeters (TLDs), or other radiation monitoring devices. These techniques are not practical for routine patient dosimetry, due to the time that they require, and the fact that measurement devices need to be placed internal to the subject being scanned—not feasible for live human imaging.

Although the CTDI was never intended by its originators as a direct measure of patient dose, over the years scientists and CT practitioners have sought to make the CTDI a dosimetric quantity. The $CTDI_{100mm}$ values can be measured on a specific scanner at both the center hole and the peripheral hole on the standard PMMA phantom (shown in FIG. 4). The $CTDI_{100mm}$ measurement at the center is dubbed $CTDI_{center}$, and the peripheral measurement is called $CTDI_{periphery}$. The weighed CTDI, $CTDI_w$, has been defined as:

$$CTDI_w = \frac{1}{3}CTDI_{center} + \frac{2}{3}CTDI_{peripheral} \quad \text{Equation 5}$$

The $CTDI_w$ is thought to be a more accurate description of patient dose than $CTDI_{100mm}$ per se.

For multiple detector array helical CT scanners, which are the norm in modern CT facilities, the patient table is moved at constant velocity during the rotation of the CT gantry (the gantry consists of the x-ray tube, detector arrays, and other components on a rotate/rotate system). For a multiple detector array with n detector arrays, and a section thickness of T (per detector array), the table will translate a distance nT if the pitch is unity. For a table translation of S mm per complete rotation of the gantry (around 360 degrees or $2\pi$ radians), the pitch is defined as:

$$\text{pitch} = \frac{s}{nT} \quad \text{Equation 6}$$

The units of s and T, in equation 6, are in mm (or cm). When pitch<1, the dose to the patient increases because the x-ray beam over-samples the patient, and when pitch>1, the dose to the patient decreases because the x-ray beam under-samples the patient. When the pitch=1, the dose in helical CT scanning is almost the same as it is in contiguous axial scanning (which is the assumption in $CTDI_{FDA}$, mentioned above in equation 3). To adjust dose to accommodate different pitch values used on the CT scanner, the "CTDI volume" has been defined as:

$$CTDI_{vol} = \frac{CTDI_w}{\text{pitch}} \quad \text{Equation 7}$$

$CTDI_{vol}$ is meant to estimate the dose from a specific scan geometry (one slice), and this metric therefore does not take into consideration the fact that in clinical CT scanning, a length of the patient is typically scanned. The length of the CT scan in the body is often 30 to 50 cm, depending on the size of the patient and the body region to be scanned. To account for the dose in these longer scans, the dose length product (DLP) has been defined as:

$$DLP = CTDI_{vol} \times \text{scan\_length} \quad \text{Equation 8}$$

The unit of DLP is not even a dose unit, but rather has the units of (mGy cm). The DLP is often displayed on the CT console during the scan, as a very crude and scientifically obscure metric for the radiation dose that the patient being scanned receives.

There are number of developments in CT technology which suggest that a homogeneous PMMA cylinder is no longer adequate (it never was accurate) for patient dosimetry. Specifically, CT scanners are now capable of changing the radiation output of the x-ray tube as the tube rotates (θ mA modulation) and as the patient table is translated (z-axis mA modulation).

Figure 5:
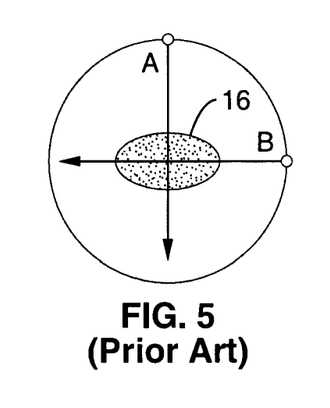
FIG. 5 illustrates the generally elliptical profile of a patient.

Referring now to FIG. 5, as the tube rotates around the typical patient, depending on the location in the body, the profile of the patient is usually elliptical and not circular. To obtain the best image quality at the lowest radiation dose levels, modern CT scanners turn down the output of the x-ray tube at location A, where the projection of the patient is thinner and less radiation is needed, but turn up the radiation output of the tube at location B, where more x-rays are needed to penetrate the thicker patient projection at that angle.

Figure 6:
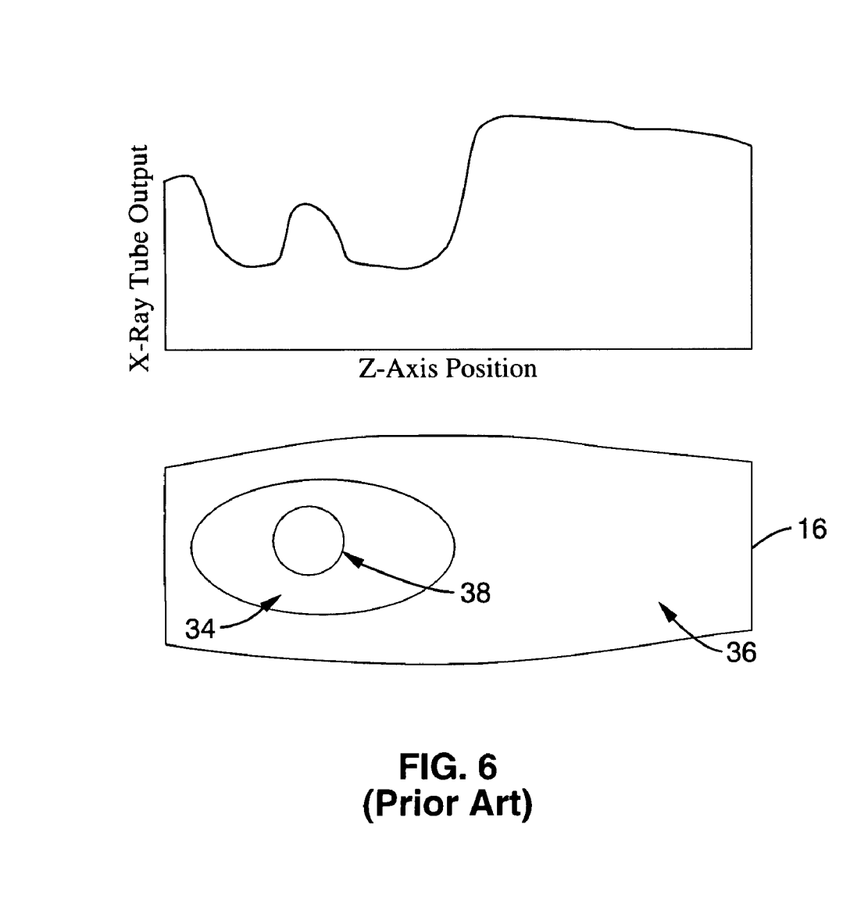
FIG. 6 shows conventional z-axis modulation in CT.

Referring now to FIG. 6, Z-axis modulation works by changing the output of the x-ray tube during the CT scan as the effective thickness of the patient 16 changes. For example, less radiation is needed to penetrate the lung fields 34 (due to the low density of the lungs), while higher radiation levels are needed to penetrate the thicker abdomen 36.

Interestingly, both the θ and z-axis mA modulation schemes are determined by the shape (x-ray transmission properties) of the patient. The PMMA cylinder used for conventional CT dosimetry is constant in both θ and z, and does not represent an actual patient's shape. Thus, without knowing the patient's shape, accurate dosimetry would be virtually impossible.

BRIEF SUMMARY OF THE INVENTION

An aspect of the present invention is a process for computing CT dose that is adapted to provide for patient dosimetry on an individualized basis. In one embodiment, the CT dose is computed in a two step process. First, the radiation dose to the patient from the primary x-ray beam is computed, and second, the dose from the scattered radiation is calculated.

One aspect of the present invention is a method for determining a radiation dose delivered to a patient during a computed tomography (CT) scan of the patient. The method includes the steps of subjecting a patient to an x-ray beam from an x-ray source, determining a primary x-ray radiation level from the x-ray beam, determining a scattered x-ray radiation level from the x-ray beam, and calculating a radiation dose delivered to the patient based on the primary x-ray radiation level and scattered x-ray radiation level.

In general, the primary x-ray radiation level comprises the deposition of energy in the patient from x-ray photons which have their original trajectory from the x-ray source. Furthermore, the scattered x-ray radiation level comprises the deposition of energy in tissues from x-ray photons which have been scattered within the patient and out of line from their original trajectory from the x-ray source.

In a preferred embodiment of the current aspect, the primary x-ray radiation level is determined by calculating a primary dose distribution from CT scan image data generated during the CT scan of the patient. The CT scan image data may be scaled down prior to calculating the primary dose distribution.

In another embodiment, properties of the x-ray source are inputted, wherein the properties are used to calculate the primary dose distribution. For example, one of the properties may comprise a mA modulation scheme of the x-ray source. If the mA modulation scheme is not readily available, it may be derived from the CT scan image data to compute the radiation dose delivered to the patient.

In another embodiment, the scattered x-ray radiation level is determined by calculating a scattered dose distribution from the CT scan image data and the primary dose distribution. A secondary scattered x-ray radiation level may also be calculated from the scattered dose distribution and the CT scan image data.

In yet another embodiment of the current aspect, the boundary of an organ of the patient is determined, and an average radiation dose delivered to the organ is calculated based on the determined boundary and the calculated radiation dose. A weight factor may be applied to the average dose to calculate an effective dose to the organ.

In a further embodiment, the method may further comprise generating a CT dose distribution map from the calculated radiation dose, wherein the CT dose distribution map correlates to the CT scan image data.

In addition, one or more of the radiation dose, average radiation dose, or effective dose may be included as part of a DICOM header for a CT image of the patient. Reconstruction software and hardware of the x-ray source may also be used to calculate the radiation dose.

A further aspect of the invention is a method for computing a radiation dose delivered to a patient during a computed tomography (CT) scan of the patient. The method comprises generating a CT image dataset of a region of the patient, determining one or more parameters relating to a x-ray source used to generate the CT image dataset, and calculating the radiation dose delivered to the patient as a function of the CT image data set and the one or more parameters of the x-ray source.

Calculating the radiation dose delivered to the patient preferably comprises calculating a primary x-ray dose distribution from the CT image dataset, calculating a scattered x-ray dose distribution from the CT image dataset, and calculating the radiation dose delivered to the patient based on the primary x-ray dose distribution and scattered x-ray dose distribution. The scattered x-ray dose distribution may be calculated as a function of the CT image dataset and the primary x-ray dose distribution.

In another embodiment of the current aspect, an average radiation dose may be calculated for a specific CT image in the CT image dataset. In a further embodiment, the radiation dose is calculated with a PACS system.

Yet another aspect is a method for computing a radiation dose delivered to a patient during a computed tomography (CT) scan of the patient. The method comprises generating a CT image dataset of a region of the patient, determining one or more parameters relating to a x-ray source used to generate the CT image dataset, calculating a primary x-ray dose distribution as a function of the CT image dataset and the one or more parameters relating to a x-ray source, calculating a scattered x-ray dose distribution as a function of the primary x-ray dose distribution, and computing the radiation dose delivered to the patient based on the primary x-ray dose distribution and scattered x-ray dose distribution.

In one embodiment, an average radiation dose for a specific CT image in the CT image dataset may be calculated.

Yet another embodiment comprises determining a boundary of an organ of the patient, and calculating an average radiation dose delivered to the organ based on the determined boundary and the calculated radiation dose. The average radiation dose may be calculated for any organ or anatomical feature, including: fetal dose, eye orbit dose, thyroid dose, bones, blood forming elements, spleen, liver, bladder, brain, gonads (male or female), breast (left or right), pancreas, kidney (left or right), and/or adrenal (left or right).

In yet another embodiment, the method includes determining a boundary of a pathological entity (e.g. cancer) of the patient, and calculating an average radiation dose delivered to the pathological entity based on the determined boundary and the calculated radiation dose. An average radiation dose delivered to a man-made entity (e.g. pacemaker) may also be calculated.

A further embodiment of the current aspect includes computing an external radiation dose delivered to the patient outside the scanned volume of the CT dataset by extrapolating the calculating radiation dose to other regions of the patient's body.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only.

DETAILED DESCRIPTION OF THE INVENTION

Referring more specifically to the drawings, for illustrative purposes the present invention is embodied in the apparatus generally shown in FIG. 7 through FIG. 13. It will be appreciated that the apparatus may vary as to configuration and as to details of the parts, and that the method may vary as to the specific steps and sequence, without departing from the basic concepts as disclosed herein.

Figure 7:
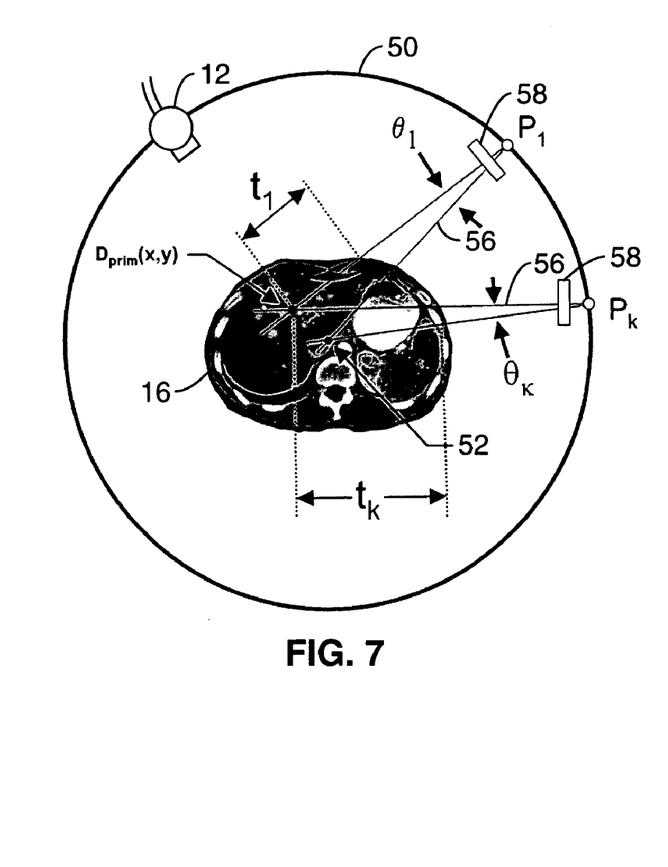
FIG. 7 illustrates a schematic diagram of the geometry of a CT scanner for use in image-based CT dose calculation in accordance with the present invention.

FIG. 7 illustrates the geometry for the image based CT dose calculation. The outer circle 50 is the path of the x-ray source 12 around the patient 16 (radius=source 12 to isocenter 52 distance, SIC), and locations $P_1$ and $P_k$ are indicated but there is a complete circular output. The gray block 58 intercepting the x-ray beam 56 represents a bow tie filter. The primary radiation dose to the patient at a location (x,y,z) is indicated at location $D_{prim}(x,y,z)$.

The image data set in CT is related to the linear attenuation coefficient (LAC), and it is also an accurate geometrical depiction of the patient (the dimensions in x, y, and z are accurate and can be used to determine the x-ray path length through the patient, for example). These facts combined mean that the CT image data set can be used to compute the radiation dose to each patient on an individualized basis, as long as some basic information is known about the configuration of the CT scanner and its x-ray output properties. Furthermore, because the CT image data contains information regarding the patient's shape in both θ and the z-axis, the dose can be computed taking into consideration the θ and z-axis modulation that most scanners employ.

Input Variables

In addition to the patient's set of CT images (the CT volume data set), some parameters that describe both the geometry and the x-ray beam properties of a specific CT scanners may be needed. These parameters are discussed below. Some of these parameters are simple dimensions of the CT scanner, and once these are determined they are valid for the life of the scanner. Those parameters which can vary over time would be measured periodically by personnel associated with the CT facility (most state laws require CT output measurements to be performed annually).

Most medical images in the modern environment conform to a file format designated by the National Equipment Manufacturer's Association (NEMA) and the American College of Radiology (ACR), the so called DICOM format (digital image and communication in medicine). This implies that specified information is present in the header of each image file, for each patient. This header file (the DICOM header), contains most of the information necessary for the dose computations.

The parameters, in addition to the patient's actual image data, used for the CT dose calculation method of the present invention are:

(A) SIC: The distance between the x-ray source 12 and the isocenter 52 of the scanner. The isocenter 52 is the center of rotation of the gantry, and it is also the center of the CT images which are reconstructed (unless specific off-axis shifts are requested by the CT operator).

(B) F(θ,E): The shape of the x-ray output profile as a function of the fan angle (θ), essentially the x-ray fluence versus angle. Let this function be referred to as F(θ,E). This function is symmetrical around the central x-ray axis of the CT scanner (the central x-ray axis is a line that runs between the x-ray source and the isocenter). The x-ray fluence versus angle can be measured by a qualified person (typically a medical physicist), or it can be accurately computed if the shape (thickness versus angle) of the beam shaping filter 58 is known. Typically, the shape of the beam shaping filter 58 is proprietary to each vendor. The beam shaping filter 58 is also called the "bow tie filter", because it physically has a shape similar to a bow tie. The function F(θ,E) is a function of the angle θ (defined in FIG. 7), and also is a function of the x-ray energy.

(C) X-ray Output (mGy/100 mAs): The x-ray air kerma (or exposure) measured at the isocenter 52 of the scanner. This may be determined using a pencil chamber like that illustrated in FIG. 4., except that the chamber is exposed to the CT beam in the absence of the PMMA phantom (this is called free-in-air).

(D) kVp and HVL: The x-ray peak kilovoltage (kVp) and half value layer (HVL). The kVp is a parameter that is set by the CT technologist during the CT scan, and for most scanners this value is between 80 kVp and 140 kVp. This value is encoded into the header of each image file (DICOM header), and so it is generally available with the image data. The HVL is measured periodically (usually when a CT scanner is purchased and installed), and at some institutions this is measured annually. Either way, the HVL tracks with the kVp, and does not change appreciably over the course of a year. Typically, the HVL is measured along the central x-ray axis of the scatter (where θ=0). The combination of kVp and HVL can be used to accurately determine the x-ray spectrum (φ(E)) of the CT scanner (for example, measured along the central axis of the system) using spectral modeling techniques.

(E) $\mu_w$: The value of $\mu_w$ is a function of calibration parameters used for a specific CT scanner. Knowing the x-ray spectrum (as mentioned in D above), the value of $\mu_w$ can be accurately computed.

(F) dx, dy and dz: The dimensions of the image pixels (dx,dy) and the center to center spacing between CT sections (images) (dZ). These values are a standard part of the DICOM header, and thus are a part of the image data set.

(G) mA modulation scheme: The x-ray output at any instant in time is controlled by the x-ray tube current, the so-called mA (milliamperes). The mA as a function of angle and z-position are of particular interest in computing the CT dose using the method of the present invention. While this data is currently not a part of the standard DICOM header, various agencies (NEMA, ACR, etc.) are discussing new updates to the DICOM standard which may require the mA-modulation information to be included in the DICOM header. Even without the mA modulation data, the CT image data set (the images themselves) can be used to accurately determine the mA modulation after some initial calibrations with an elliptical phantom. Different CT manufacturers use slightly different approaches to modulating the mA, but these are generally known to those skilled in the art and this knowledge can be used along with the thickness/attenuation data intrinsic to the CT images to compute the mA as a function of both theta and z-axis position.

CT Dose Calculation

In a preferred embodiment of the invention, the CT dose is computed in a two step process. First, the radiation dose to the patient from the primary x-ray beam is computed, and second, the dose from the scattered radiation is calculated. Primary radiation can be defined as any x-ray photon that emanates from the x-ray source, and which has not interacted yet. The first interaction of that photon in the patient (or other structures, such as the detector) refers to the interaction of primary radiation, and this includes primary x-ray dose deposition.

Scattered radiation refers to the radiation that has undergone at least one scattering event, such as in the Rayleigh or Compton scattering interactions. Scattered radiation, in general, has a path that is no longer in-line with the x-ray source, and thus once a primary photon interacts by scattering, the trajectory of that photon no longer carries useful information in the context of image formation. Scattered radiation is therefore redirected from its original trajectory, but often undergoes subsequent (second, third, fourth, . . . ) interactions within the patient, each time depositing some of its energy as radiation dose. Scattered radiation is a significant contributor to radiation dose in the patient.

Primary Dose Deposition:

In one embodiment of the invention, the process of computing the CT dose to the patient is as follows:

The SIC, F(θ,E), φ(E), $\mu_w$, x-ray output (mGy/100 mAs), and mA as a function of angle and z are known.

The image data can be used at full resolution (typically 512×512 pixels per image), or can be down-sampled to smaller image matrices (e.g., 256 or 128) to allow faster computation.

The image data, which in computed tomography is calibrated in HU, is converted to the linear attenuation coefficient, μ, by essentially rearranging Equation 2 to form Equation 9:

$$\mu = \frac{\mu_w}{1000} HU + \mu_w \quad \text{Equation 9}$$

A picture element is a pixel, and corresponds to the point on the image corresponding to a specific location in the patient. A volume element, or voxel, refers to a 3-dimensional region (a volume) in the patient, which corresponds to a specific pixel. Because dose deposition occurs in the patient and not in the patient's image, the "voxel" descriptor is used here.

Referring to the geometry illustrated in FIG. 7, Equation 10 is used to compute the primary dose $D_{prim}$ to a voxel located at position (x,y,z) in the patient.

$$D_{prim}(x, y, z) = \sum_{E=0}^{E_{max}} \sum_{k=1}^{N} p(k, \theta) ISL(x, y, z, k) \Phi(E) e^{-\mu(E)t_i} (1 - e^{-\mu(E)\Delta}) \quad \text{Equation 10}$$

The summations in Equation 10 are over the x-ray energy E and over the source locations.

Although Equation 10 could be used to compute $D_{prim}$, if the effective energy E' is used for the x-ray spectrum, then the process can be simplified by eliminating the summation over x-ray energy. Furthermore, the linear attenuation coefficients in the CT images are already averaged over energy, and thus simplifying the dose calculations using the effective energy makes better use of the existing data. Using the effective energy then, Equation 10 becomes:

$$D_{prim}(x, y, z) = \sum_{k=1}^{N} P(k, \theta, z) ISL(x, y, z, k) F(\theta) e^{-\mu t_1} (1 - e^{-\mu \Delta}) \quad \text{Equation 11}$$

The function P(k,θ,z) refers to different x-ray source 12 locations, with k indexing between 1 and N as the source rotates around the patient multiple times. Thus, as k indexes from 1 to N, the values of θ and z also change. P(k,θ,z) therefore refers to the (s,t,u) position of the x-ray focal spot (inside the x-ray tube) as the x-ray tube orbits the patient and as the patient translates through the CT gantry. The index k is linear with time, and assuming constant velocity of the patient translation as well as constant angular velocity of the gantry (which is the case), the (s,t,u) coordinates of the x-ray source can be computed using:

$$u = \alpha_o + \alpha k$$

and $$\gamma = \beta_o + \beta k$$

where:

$$s = SIC \cos(\gamma)$$

$$t = SIC \sin(\gamma)$$

and where $\alpha_o$ and $\beta_o$ relate to the starting position of the gantry at the start of the CT scan, and the factors α and β relate to the table speed and gantry rotation speeds, respectively.

The mA modulation schemes are an intrinsic component of P, and thus P can be modified using the stored theta and z-axis mA modulation schemes. If the mA modulation is not available, the images can be used to compute the approximate mA modulation scheme, which will be discussed later.

In practice, patient dose can be computed very accurately without using all of the x-ray source 12 locations where data was collected during the actual CT scan, and this is because the x-ray dose does not need to be defined with high spatial resolution. For example, although perhaps 1080 individual x-ray projections are acquired by the CT scanner to produce each CT image, these 1080 source locations could be reduced to around 360 or 180 locations for the dose calculation without a loss of utility. Of course the radiation levels need to be rescaled to accommodate such a reduction—that is, if the radiation output per N acquisition locations is X, by reducing the number of computation points to N/10, the radiation level at each point should be increase to 10×. This step allows the computation of patient dose to be faster and more efficient.

The ISL(x,y,z,k) term in Equation 11 refers to the inverse square law, a physical phenomenon known to occur when a point source of radiation is used (as in CT). The ISL term corrects the intensity of the x-ray beam 56 to the location of a specific voxel (x,y,z) 60 in the patient 16. The radiation intensity is known at the isocenter 52 of the scanner, and the distance from isocenter 52 to the x-ray source 12 is the SIC. The distance R(x,y,z) is the distance from the x-ray source 12 to voxel (x,y,z) 60. The source position is defined by the Cartesian coordinates (s, t, u), and then the distance R( ) is given by:

$$R(x,y,z) = ([x-s]^2 + [y-t]^2 + [z-u]^2)^{0.5} \quad \text{Equation 12}$$

With this, the ISL term becomes:

$$ISL(x, y, z, k) = \left(\frac{SIC}{R(x, y, z)}\right)^2 \quad \text{Equation 13}$$

The function $F(\theta)$ in Equation 11 describes the angular dependent attenuation of the bow tie filter in the scanner. Computationally, the function $F(\theta)$ describes the thickness of the filter 58 material or materials as a function of angle. Let $T_a(\theta)$ and $T_b(\theta)$ describe the thickness versus angle of the bow tie filter 58 for a specific CT scanner for two different materials (a and b), and let $\mu_a$ and $\mu_b$ describe the linear attenuation coefficients for those materials. Thus, $$F(\theta) = e^{-\mu_a T_a(\theta) - \mu_b T_b(\theta)} \quad \text{Equation 14A}$$

The next term in Equation 11 ($e^{-\mu t_1}$) refers to the attenuation of the patient's tissues prior to the x-ray beam 56 reaching voxel (x,y,z) 60, as shown in FIG. 7. This term accounts for the x-ray beam 56 attenuation in the patient along a path of length $t_1$ (see FIG. 7). In reduction to practice, the trajectory of each ray emanating from the x-ray source 12 (such as the ray emanating from source location P1 as shown in FIG. 7) is computed by solving the equation for a line in three dimensions using the spatial Cartesian locations of the x-ray source P1(k)->(s,t,u) and those of the voxel (x,y,z) 60. The computer algorithm then finds all voxels which intersect this ray and that lay between voxel (x,y,z) 60 and the x-ray source 12 at (s,t,u). If $\Delta$ is the dimension of each voxel, then the total x-ray beam attenuation, G, along the $t_1$ trajectory is given by:

$$G = e^{-\mu_1 \Delta - \mu_2 \Delta - \mu_3 \Delta \ldots -\mu_N \Delta} \quad \text{Equation 14B}$$

The final term in Equation 11, $(1-e^{-\mu\Delta})$, describes the absorption of the passing x-ray beam 56 in the voxel (x,y,z) 60 itself, and this is needed to reflect the fact that this volume of tissue is absorbing some of the x-ray energy that is passing through it.

Scatter Dose Deposition:

As mentioned previously, scattered x-ray photons can interact subsequently from the first scattering event, leading to multiple scattering events for some photons. Multiple scattering takes place with non-trivial probability. It has been shown in the past that with each scattering event, the scatter distribution becomes lower in spatial frequency (in lay terms, blurrier). Following scattered x-ray photons in an object such as a patient is what so-called Monte Carlo programs do, and using Monte Carlo methods, the dose deposition pattern in the patient can be computed with high accuracy. However, Monte Carlo programs follow photons individually, and thus to build up the total dose of a CT scan (with a million billion total photons—$\sim 10^{15}$), many hours or days of computation time would be required. This is generally not practical for patient dosimetry.

The dose distribution for first-scattered x-ray photons may be computed using the image data coupled with the primary dose distribution using deterministic equations (not Monte Carlo techniques), and although the compute cycles required are significant, the algorithm achieves solutions in a short period of time (1-2 minutes). This could be made faster with hardware and software improvements. Furthermore, CT scanner computer subsystems (hardware and/or software), which speed up the computation of the CT images, may be used to compute the radiation doses to the patient.

To compute the scatter dose distribution in the patient $D_{scat}(x,y,z)$, the image data mapped to linear attenuation coefficient (Equation 9) V(x,y,z) for the patient is used, and the primary dose distribution $D_{prim}(x,y,z)$ is used as well.

Different tissues in the body produce scattered radiation with different intensities. In general, soft tissues (such as liver or heart 38) scatter a fair amount and tissues with higher Z (atomic number) elements (such as bone and tissues with iodinated contrast material in them) scatter less. The image data set V(x,y,z) provides a good estimate of tissue types—when the Hounsfield Units (HU) are very low (HU<−800), this corresponds to lung tissue or mostly air, with very little scattering, when −800<HU<+100, this corresponds to soft tissue areas in the body, and HU>+500 corresponds to bone. These numbers are approximate. In general, the amount of scattering decreases as the HU increases, and a continuous function SPR($\mu$) can be defined for this.

$$D_{scat}(x, y, z) = \quad \text{Equation 15}$$
$$\sum_{x'=x-d}^{x+d} \sum_{y'=y-d}^{y+d} \sum_{z'=z-d}^{z+d} D_{prim}(x', y', z') SPR(\mu[x', y', z'])$$
$$S(x, y, z, x', y', z') e^{-\mu W}(1 - e^{-\mu \Delta})$$

Figure 8:
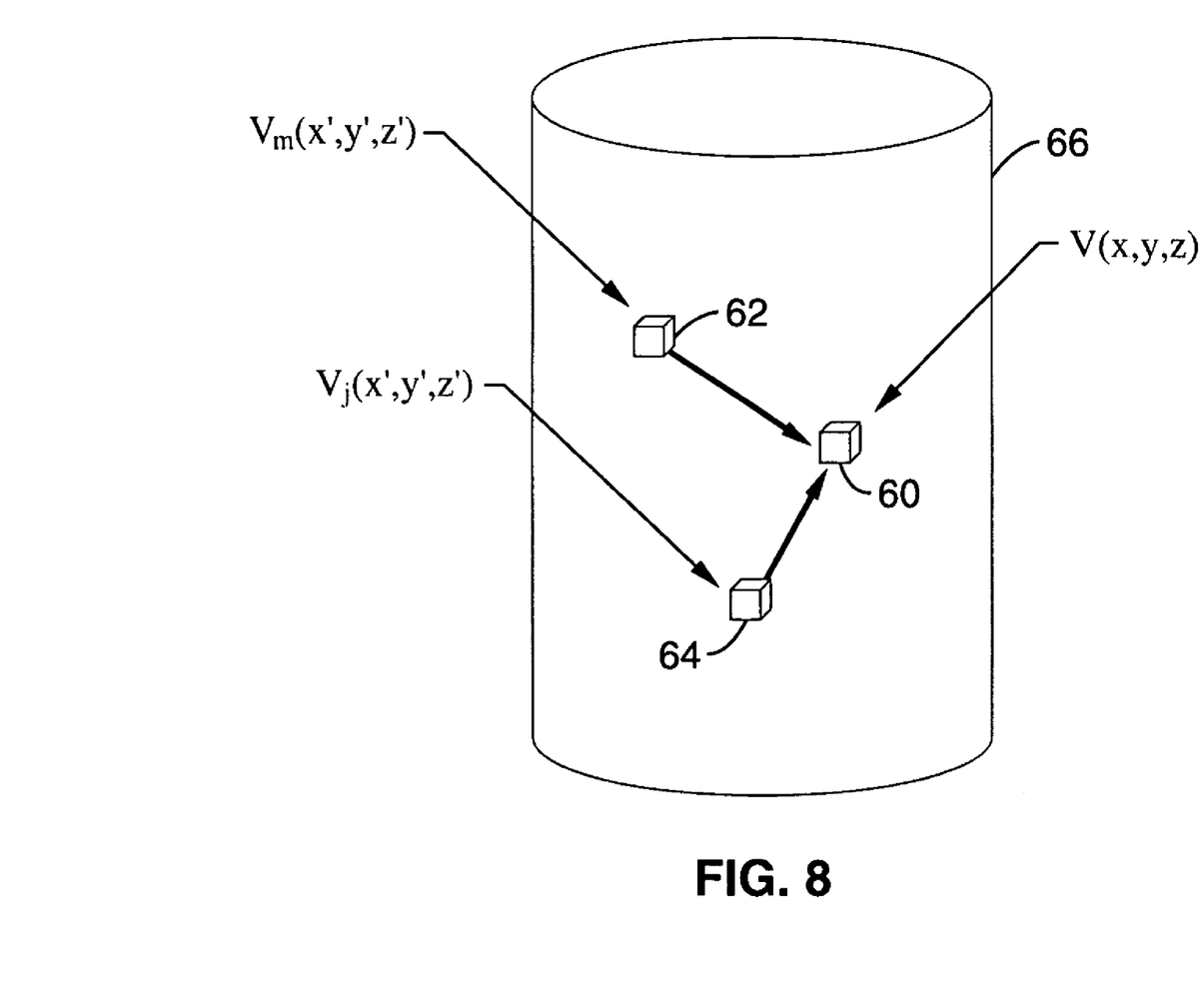
FIG. 8 is a schematic diagram illustrates the scanned patient volume and specified voxels.

FIG. 8 illustrates the overall patient data (e.g. cylinder 66), and shows three voxels (60, 62, 64) are used as examples out of the millions of voxels within the patient. Voxel V(x,y,z) 60 is the voxel where the scatter dose is being computed, and voxels $V_m(x',y',z')$ 62 and $V_j(x',y',z')$ 64 are voxels (of many) which contribute scattered radiation dose to voxel V. In Equation 15, the scatter dose computation $D_{scat}(x,y,z)$ for voxel V(x,y,z) 60 is being computed. The three summation symbols in Equation 15 describe the fact that the contribution of scattered radiation from all surrounding voxels $V_j(x', y', z')$ 64 to the voxel of interest V(x,y,z) 60 needs to be included in the tally. The summations in Equation 15 include the scatter contribution from the surrounding tissues in all three directions from V(x,y,z) over a finite distance of d, such that a cube of patient data with side dimensions 2D is centered about the voxel of interest V(x,y,z). The contribution of scatter from far away voxels diminishes rapidly, and by using smaller values of d, reduced computation times can be achieved without too much loss of accuracy. If compute time were not an issue, the summations in Equation 15 would range over the entire volume data set of the patient. An experienced computer programmer could easily groom the summation of scatter from adjacent tissues to be a sphere (instead of a cube), which would be a logical choice as well.

The scatter that emanates from a given voxel is proportional to the amount of primary radiation absorbed in that voxel, $D_{prim}(x',y',z')$, and that was calculated in step 1 of this dose algorithm. The SPR( ) is a continuous function (SPR=scatter to primary ratio) related to the linear attenuation coefficient of a given voxel ($\mu[x',y',z']$), as described above, and it describes the ratio of the scattered radiation to the primary. Thus, the product of $D_{prim}(x',y',z') \times SPR(\mu[x',y',z'])$ gives the relative scatter intensity given off from each pixel at (x',y',z'). The S( ) term in Equation 15 essentially computes the solid angle that is intercepted by the voxel V(x,y,z) 60 from the source voxel $V_j(x',y',z')$ 64. Let A be the projected area of the voxel (which is modeled here as a sphere of radius q, where $A=\pi q^2$), then the fractional area subtended by the emitted scatter by V(x,y,z) 60 is given by:

$$S = \frac{A}{4\pi r^2}$$ Equation 16 where $$r^2 = (x-x')^2 + (y-y')^2 + (z-z')^2$$ Equation 17

The final terms in Equation 15 are similar to those for primary dose absorption, the $e^{-\mu w}$ accounts for the attenuation of the scatter along a vector W between voxel V(x,y,z) 60 and $V_j(x',y',z')$. The last $(1-e^{-\mu\Delta})$ term is the absorption of scattered radiation in the voxel.

Figure 9:
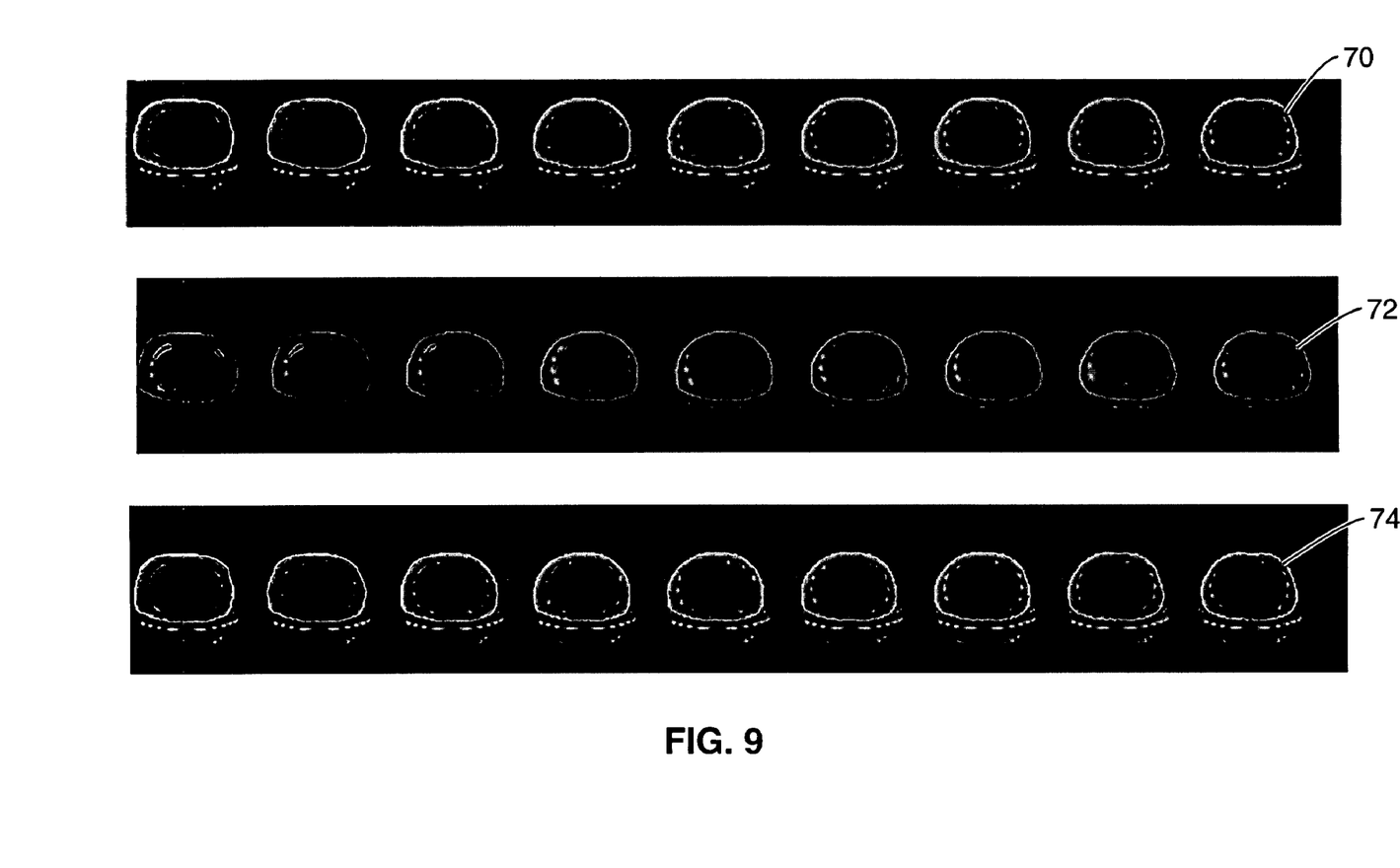
FIG. 9 shows an imaged sequence of dose computations having primary dose maps, scattered dose maps, and total dose maps.

FIG. 9 illustrates a sequence of dose computations, showing the primary dose maps 70, the scatter dose maps 72, and the total dose maps 74, which are the summation of the primary dose maps 70 and scatter dose maps 72. Notice the blurry nature of the scatter dose images 72. This is an inherent feature of the scattered photons being directed out of line with the x-ray path.

Figure 10:
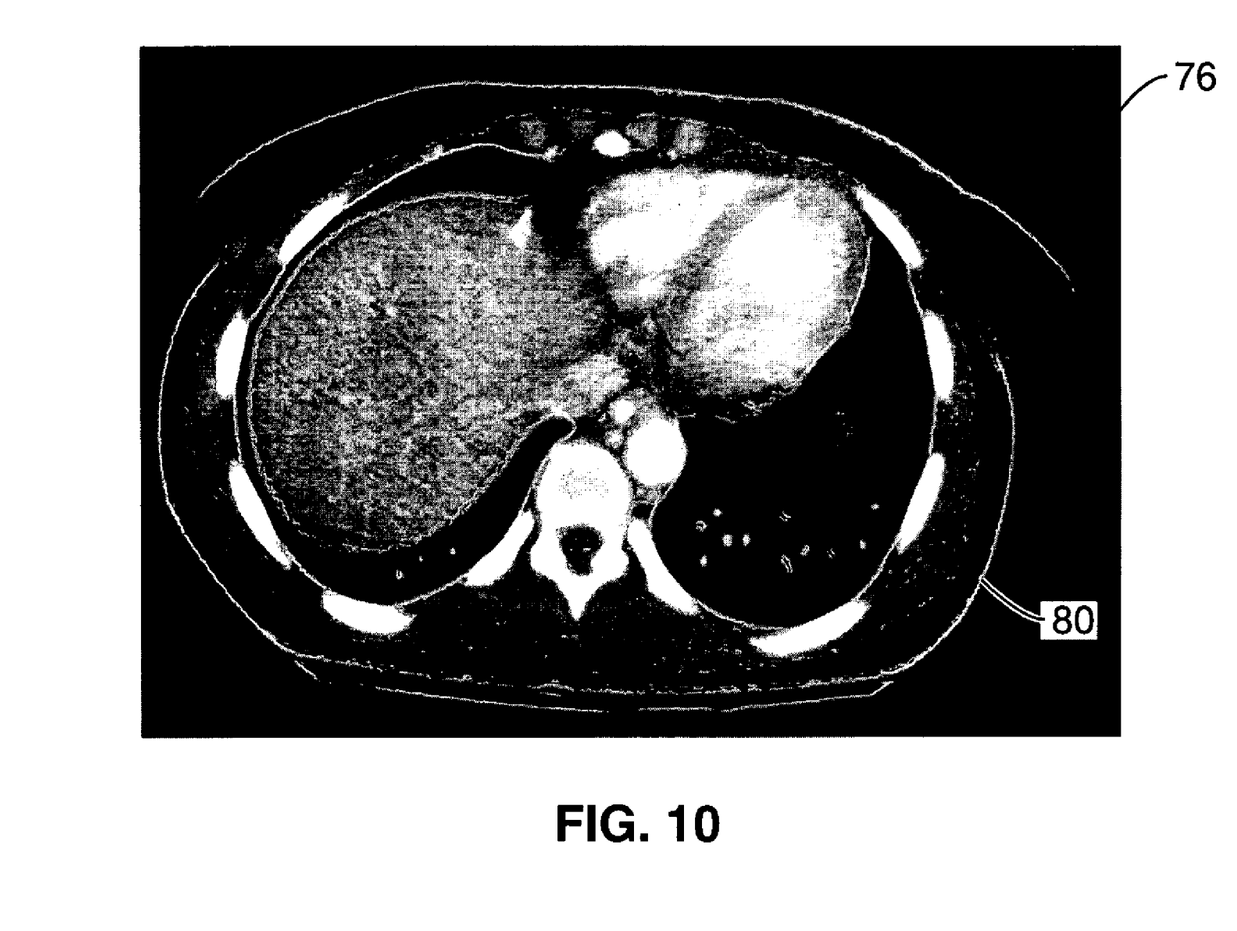
FIG. 10 shows an original CT image of a patient's thorax as compared to primary dose maps, scattered dose maps, and total dose maps of the thorax.

FIG. 10 shows images of the dose computations for the CT image of a patient's thorax 80. The upper image 76 is the original CT image of the patient's thorax 80. In the lower panel 78, the total dose image 82, primary dose image 84, and scatter dose image 86 are shown.

Given the very inaccurate methods that are used currently for radiation dose estimation to patients from CT, the methods above for computing the primary and first scatter dose contributions improve the accuracy of CT patient dosimetry by a large factor. Thus, under most circumstances, the above computations are sufficiently accurate for the purposes of patient dosimetry. However, secondary scatter dose $D_{2,scat}(x,y,z)$ may also be accounted for by essentially repeating the first scatter computation effect as described above, replacing the $D_{prim}(x',y',z')$ term with the $D_{scat}(x',y',z')$ term as shown in Equation 18 below:

$$D_{2,scat}(x,y,z) =$$ Equation 18

$$\sum_{x'=x-d}^{x+d} \sum_{y'=y-d}^{y+d} \sum_{z'=z-d}^{z+d} D_{scat}(x',y',z') SPR(\mu[x',y',z'])$$

$$S(x,y,z,x',y',z') e^{-\mu W} (1-e^{-\mu\Delta})$$

The total dose to each voxel, Dose(x,y,z), in the volume data set is given by the summation of the primary and scatter doses:

$$Dose(x,y,z) =$$ Equation 19

$$\frac{1}{\rho V} \{D_{prim}(x,y,z) + D_{scat}(x,y,z) + \ldots D_{2,scat}(x,y,z)\}$$

The multiplier $1/\rho V$, where $\rho$ is the density of a voxel and V is its volume, and where the product $\rho V$ is the mass of the voxel, scales the dose computations described above to the proper units of dose, which are energy/mass.

Compilation of CT dose per pixel may require significant computer time. Accordingly, one embodiment of the invention is to reduce computation time by scaling the CT images to a lower resolution (e.g. by using a smaller image array), prior to computing the doses. For example, typical CT images are in a 512×512, format, and while this "resolution" is needed for image diagnosis, the radiation dose information does not need to be computed with such detailed resolution. Thus, the 512×512×Nz images could be reduced in format to 256×256×Mz or 128×128×Mz, or any other smaller image format, prior to CT dose computations. The value of Nz, Mz, corresponds to the number of CT images that make up the volume data set for that scan in that patient.

Once the CT dose is computed at a lower matrix size, the dose data can be expanded by interpolation to the full size (e.g. 512×512) image matrix for display and/or other organ dose computations.

Computing the mA Modulation Scheme from the Images

The shape of the patient is known from the CT images, and the attenuation properties are also known since the images are remapped LACs. Referring back to FIG. 9, the x-ray projection of the image can be computed for each projection angle. This is essentially the same data that most CT scanners use to determine the mA modulation scheme. Although these mA algorithms are typically proprietary and known only to those workers involved in CT manufacture, these algorithms may be implemented in the context of this invention to allow greater dose computational accuracy.

Figure 11:
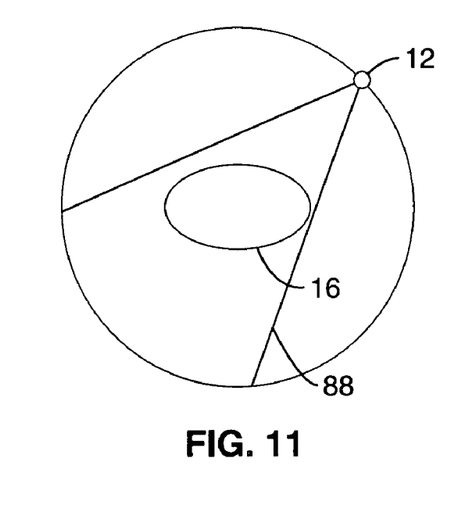
FIG. 11 shows a schematic diagram for computing the mA modulation of a scanner.

Referring to FIG. 11, the projection 88 of the CT image may be computed using standard forward projection techniques. From this data, the average attenuation of the patient 16 in that projection can be computed. This attenuation factor, or similar metrics related to the projection data, can be used to estimate the mA modulation used by a specific x-ray CT scanner. Different vendors use different mA modulation schemes, and this invention allows individuals as well as CT vendors to tune the dose computation to their mA modulation algorithms.

Including Tissues Outside the Scanned Volume

The method of the present invention detailed above allows the computation of patient dose throughout the volume of the body, at least that part of the body that was scanned and where CT images were generated. However, the radiation dose to body parts which exist outside of the scanned volume, which is due to scattered radiation only, cannot be computed using the images.

Figure 12:
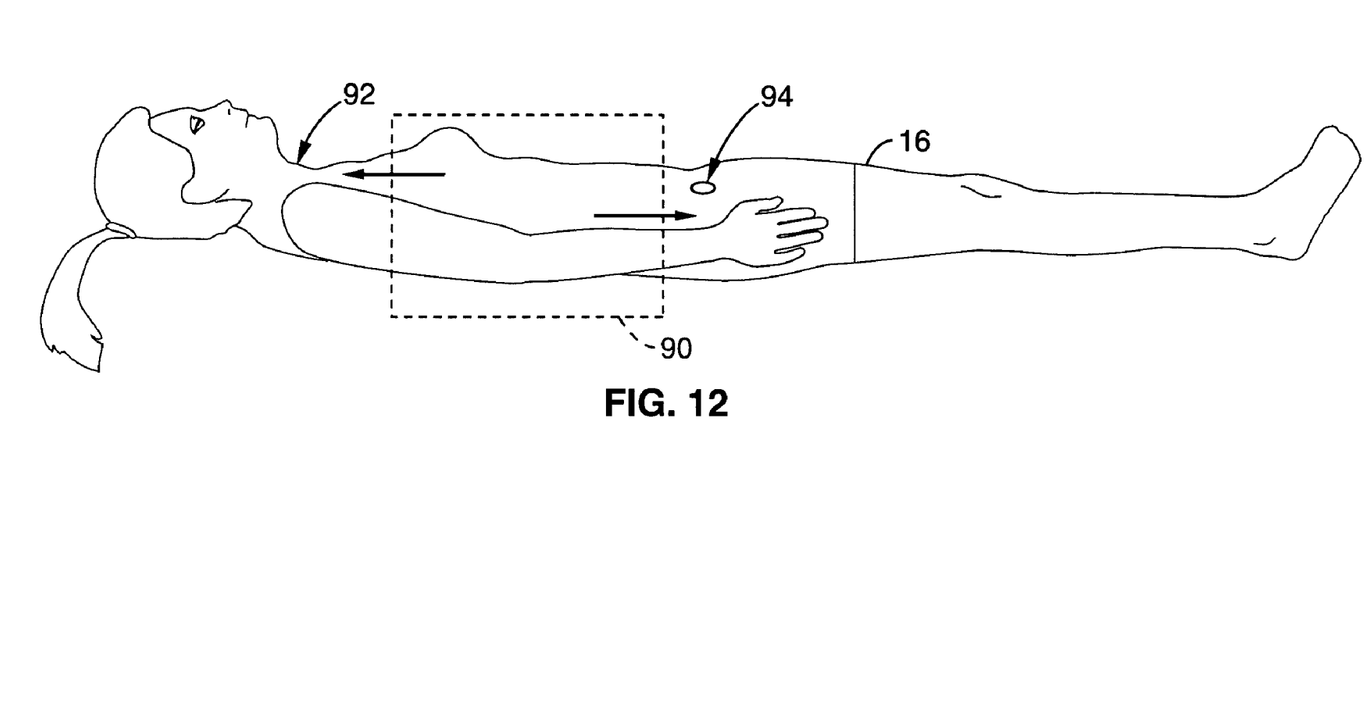
FIG. 12 illustrates an exemplary CT volume dataset boundary in relation to a patient's body.

FIG. 12 illustrates a preferred embodiment in which the radiation dose to regions of the patient's body 16 are calculated beyond the edges of the CT image data set 90, by add additional, simulated image data to the patient's CT volume data set. The simulated data would be based on the patient's images, and would extend the computation of scatter to beyond the edges of the actual image data set (e.g. the thorax 80 and corresponding maps 82, 82 and 86 in FIG. 10).

The simulated images may be produced using an extrapolation model. For example, for a thoracic CT scan, a number of individual vertebrae are visible on the images. Either computer algorithms or manual identification may be used to locate a number of these vertebrae (e.g. T5 and L1), and distance measured can be determined for that patient. From these data and statistical metrics determined from other patient CT scans, the distance to the patient's thyroid 92 or gonads 94 (for example) is computed. Indeed, the patient's contour may be extended using relatively simple contour modeling, and the scattered energy deposited in the thyroid 92 may be estimated using the techniques described in Equation 15.

In an additional embodiment of the present invention, a systematic calibration and series of tables may be used to accurate estimate radiation dose to crucial organs.

Computation of Effective Dose

Effective dose is the metric that is used in radiation science that is thought to most accurately assess the radiation risk to the patient. To compute the effective dose, the absorbed dose to a number of organs needs to be computed. Because the method of the present invention allows the computation of radiation dose through the tissues of each patient by identifying the regions which are within various organs (for example the breast), the average dose over that organ can be computed by averaging the individual voxel doses within the boundary of the organ. In addition, organ doses may be calculated by averaging the spatial dose maps generated by the preferred embodiment over the spatial (x,y,z) extent of the organ.

In a preferred embodiment, the organ boundaries are automatically identified using appropriate computer recognition tools. Alternatively, manual outlining may be performed. In a further alternative embodiment, patient based metrics regarding typical organ location and volume can be used from a central fiducial marker, for example a specific vertebrae such as L-1. Data may be stored as look up tables or files which define where each organ typically is located inside the patient (using image data), thereby allowing computation of distances and direction vectors from the fiducial marker.

Once the organ boundaries are identified, the average dose computations are made. Having the mean dose to a number of organs computed, weighing factors are applied, such as the ICRP 60 (1990) weighing factors shown in the Table 1 below. From there, the effective dose (e.g. in Sieverts or mSv) is computed. The age of the patient may also be used to apply age-dependent weighting coefficients (this information is readily available as the age of the patient is typically a part of the DICOM header).

Figure 13:
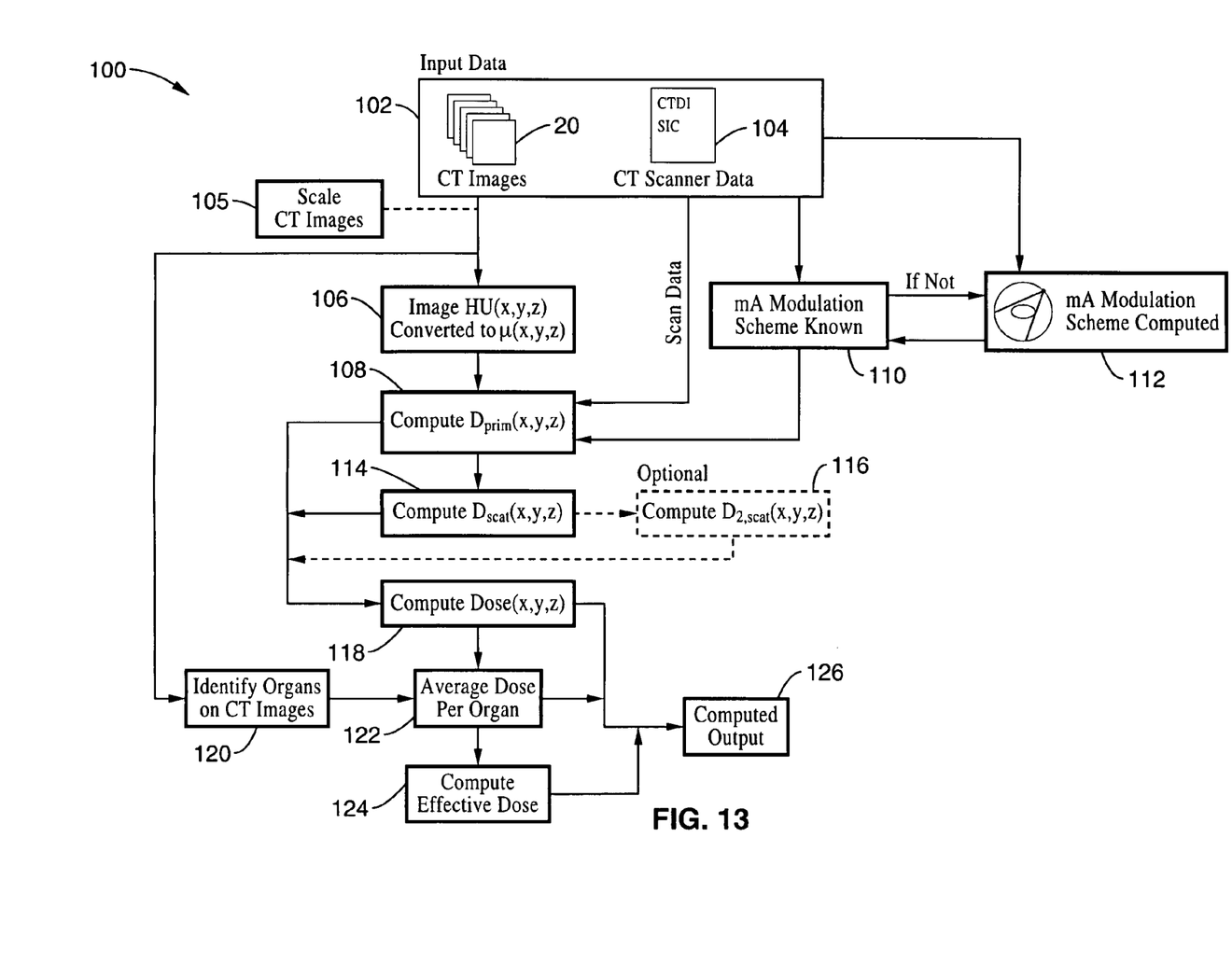
FIG. 13 illustrates an exemplary flowchart for computing radiation dose of a CT scanner in accordance with the present invention.

FIG. 13 illustrates a flowchart for an algorithm 100 for computing radiation dose in accordance with the method of the present invention. First, data is input at step 102. This includes the patient's CT images (e.g. CT volume data set 20 shown in FIG. 3), and CT scanner data, (such as CT scanner properties SIC, $F(\theta,E)$, $\phi(E)$, $\mu_w$, x-ray output (mGy/100 mAs), and mA modulation detailed above with respect to FIG. 7). The image data may optionally be scaled down (e.g. reduced from 512×512 images to 256×256 or 128×128) in step 105 prior to computation to reduce computation time.

At step 106 the CT image data is converted from Hounsfield Units HU(x,y,z) to the linear attenuation coefficient, $\mu(x,y,z)$ (e.g. with use of Equation 9).

The converted data, along with the scanner data 104 and mA modulation scheme 110 (if known) is then computed with Equation 10 to get the primary dose $D_{prim}$ at step 108. If the mA modulation scheme is not known (i.e. not part of the DICOM header, or not otherwise provided), the image data set may be used to calculation the mA modulation scheme at step 112, as described with respect to FIG. 11.

Next, the image data and the primary dose distribution $D_{prim}(x,y,z)$ are used to compute the scatter dose distribution in the patient $D_{scat}(x,y,z)$ in step 114, as detailed above with respect to FIG. 8. In addition, the secondary scatter dose $D_{2,scat}(x,y,z)$ may optionally be computed at step 116.

The above data may then be used to compute the total dose(x,y,z) at step 118, which may be output at step 126. The total dose may also be computed at the same time as CT imaging using some of the same steps during CT back projection via a CT back projection algorithm. The output step 126 may comprise one or more of the total dose, average CT dose per CT image (as computed in step 118), organ dose, energy imparted, or effective dose as a part of the DICOM header file in the image (either in public or private "tags").

To obtain the effective dose, the organ boundary data derived in step 120 and the total dose computed in 108 are then used to compute the average dose per organ in step 122. The weighing factors are then applied in step 124 to get the effective dose, which is then output at step 126.

Output step 126 may include displaying the computed patient average radiation dose, organ dose, and or effective dose on a CT console after patient scanning.

Output step 126 may further or alternatively include displaying one or more of the computed patient average radiation dose, organ dose, and/or effective dose on a display workstation that physicians used to interpret the images, such as a workstation that is part of a PACS system (Picture Archiving and Communication Systems). For example, when a pregnant patient is scanned using CT, the fetal dose can be computed and displayed. Computation of patient dose from CT image data (and tabulated CT scanner characteristics) may be also performed using the PACS system.

In another embodiment, output step 126 may further or alternatively include actual computed total dose images similar to the CT images, but are maps of the CT dose distribution (in suitable units such as milligray—mGy), e.g., like those images shown in FIG. 9. CT dose distribution images as described above would provide additional data to practitioners from the already computed CT images.

It is appreciated that the method of the present invention may be used to calculate the CT radiation dose or create dose distribution maps of a number of different organs or anatomies. For example, fetal dose, eye orbit dose, thyroid dose, bones, blood forming elements, spleen, liver, bladder, brain, gonads (male or female), breast (left or right), pancreas, kidney (left or right), adrenal (left or right), or any other body organ or tissue type may be computed.

In addition, the method of the present invention may be used to compute the delivered dose to specific pathological entities such as to cancers, sites of benign disease, etc. The dose delivered to specific man-made entities, such as implanted dosimeters, trans-rectal or trans-vaginal probes, endoscopes, prosthetic devices (e.g. artificial hip), or cardiac assist devices (e.g. pacemaker), may also be computed.

In a further embodiment of the invention, lifetime risk estimate data may be further calculated from the CT image-based radiation dose computations.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art. In the appended claims, reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by this disclosure and the appended claims. Moreover, it is not necessary for a device or method to address each and every problem sought to be solved by the present invention, for it to be encompassed by this disclosure and the claims. Furthermore, no element, component, or method step in this disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

TABLE 1

| Tissue or Body Part | $W_T$ |
| --- | --- |
| Gonads | 0.20 |
| Bone Marrow | 0.12 |
| Colon | 0.12 |
| Lung | 0.12 |
| Stomach | 0.12 |
| Bladder | 0.05 |
| Breast | 0.05 |
| Liver | 0.05 |
| Esophagus | 0.05 |
| Thyroid | 0.05 |
| Skin | 0.01 |
| Bone Surface | 0.01 |
| Remainder (adrenals, brain, upper large intestine, small intestine, kidney, muscle, pancreas, spleen, thymus, and uterus) | 0.05 |
| Total: | 1.00 |

What is claimed is:

1. A method for determining a radiation dose delivered to a patient during a computed tomography (CT) scan of the patient, comprising:
   subjecting a patient to an x-ray beam from an x-ray source;
   determining a primary x-ray radiation dose from the x-ray beam;
   determining a scattered x-ray radiation dose from the x-ray beam;
   inputting properties from the x-ray source;
   wherein determining the primary x-ray radiation dose comprises calculating a primary dose distribution from CT scan image data generated during the CT scan of the patient; and
   calculating a radiation dose delivered to the patient based on the primary x-ray radiation dose and scattered x-ray radiation dose;
   wherein said properties are used to calculate the primary dose distribution;
   wherein one of said properties comprises a mA modulation scheme of the x-ray source;
   wherein the mA modulation scheme is used to compute the radiation dose delivered to the patient.

2. A method as recited in claim 1:
   wherein the primary x-ray radiation dose comprises the deposition of energy in the patient from x-ray photons which have their original trajectory from the x-ray source; and
   wherein the scattered x-ray radiation dose comprises the deposition of energy in tissues from x-ray photons which have been scattered within the patient and out of line from their original trajectory from the x-ray source.

3. A method as recited in claim 1, wherein the CT scan image data is scaled down prior to calculating the primary dose distribution.

4. A method as recited in claim 1; wherein the mA modulation scheme is derived from the CT scan image data to compute the radiation dose delivered to the patient.

5. A method as recited in claim 1, wherein determining the scattered x-ray radiation dose comprises calculating a scattered dose distribution from the CT scan image data and the primary dose distribution.

6. A method as recited in claim 1, further comprising:
   generating a CT dose distribution map from the calculated radiation dose;
   wherein the CT dose distribution map correlates to the CT scan image data.

7. A method as recited in claim 1, wherein reconstruction software and hardware of the x-ray source is used to calculate the radiation dose.

8. A method for determining a radiation dose delivered to a patient during a computed tomography (CT) scan of the patient, comprising:
   subjecting a patient to an x-ray beam from an x-ray source;
   determining a primary x-ray radiation dose from the x-ray beam;
   determining a scattered x-ray radiation dose from the x-ray beam;
   calculating a radiation dose delivered to the patient based on the primary x-ray radiation dose and scattered x-ray radiation dose;
   wherein determining the primary x-ray radiation dose comprises calculating a primary dose distribution from CT scan image data generated during the CT scan of the patient; and wherein determining the scattered x-ray radiation dose comprises calculating a scattered dose distribution from the CT scan image data and the primary dose distribution; and
   determining a secondary scattered x-ray radiation dose from the scattered dose distribution and the CT scan image data.

9. A method for determining a radiation dose delivered to a patient during a computed tomography (CT) scan of the patient, comprising:
   subjecting a patient to an x-ray beam from an x-ray source;
   determining a primary x-ray radiation dose from the x-ray beam;
   determining a scattered x-ray radiation dose from the x-ray beam;
   calculating a radiation dose delivered to the patient based on the primary x-ray radiation dose and scattered x-ray radiation dose; comprising:
   determining a boundary of an organ of the patient; and
   calculating an average radiation dose delivered to the organ based on the determined boundary and the calculated radiation dose.

10. A method as recited in claim 9, further comprising:
applying a weight factor to the average dose to calculate an effective dose to the organ.

11. A method as recited in claim 10, further comprising:
including one or more of the radiation dose, average radiation dose, or effective dose as part of a DICOM header for a CT image of the patient.

12. A method for computing a radiation dose delivered to a patient during a computed tomography (CT) scan of the patient, comprising:
generating a CT image dataset of a region of the patient;
determining one or more parameters relating to a x-ray source used to generate the CT image dataset; and
calculating the radiation dose delivered to the patient as a function of the CT image data set and the one or more parameters of the x-ray source;
wherein determining one or more parameters comprises determining a mA modulation scheme of the x-ray source.

13. A method as recited in claim 12, wherein calculating the radiation dose delivered to the patient comprises:
calculating a primary x-ray dose distribution from the CT image dataset;
calculating a scattered x-ray dose distribution from the CT image dataset; and
calculating the radiation dose delivered to the patient based on said primary x-ray dose distribution and scattered x-ray dose distribution.

14. A method as recited in claim 13, wherein the mA modulation scheme is derived from the CT image dataset.

15. A method as recited in claim 13, wherein the scattered x-ray dose distribution is calculated as a function of the CT image dataset and the primary x-ray dose distribution.

16. A method as recited in claim 12, wherein the CT image dataset is scaled down prior to calculating the radiation dose.

17. A method as recited in claim 12, further comprising: calculating an average radiation dose for a specific CT image in the CT image dataset.

18. A method as recited in claim 17, further comprising:
including average radiation dose for a specific CT image in a DICOM header of the CT image.

19. A method as recited in claim 12, further comprising:
generating a CT dose distribution map from the calculated radiation dose;
wherein the CT dose distribution map correlates to the CT image dataset.

20. A method for computing a radiation dose delivered to a patient during a computed tomography (CT) scan of the patient, comprising:
generating a CT image dataset of a region of the patient;
determining one or more parameters relating to a x-ray source used to generate the CT image dataset;
calculating the radiation dose delivered to the patient as a function of the CT image data set and the one or more parameters of the x-ray source;
wherein calculating the radiation dose delivered to the patient comprises:
calculating a primary x-ray dose distribution from the CT image dataset;
calculating a scattered x-ray dose distribution from the CT image dataset; and
calculating the radiation dose delivered to the patient based on said primary x-ray dose distribution and scattered x-ray dose distribution; and
determining a secondary scattered x-ray dose distribution from the scattered x-ray dose distribution and the CT image dataset.

21. A method for computing a radiation dose delivered to a patient during a computed tomography (CT) scan of the patient, comprising:
generating a CT image dataset of a region of the patient;
determining one or more parameters relating to a x-ray source used to generate the CT image dataset;
calculating the radiation dose delivered to the patient as a function of the CT image data set and the one or more parameters of the x-ray source;
determining a boundary of an organ of the patient; and
calculating an average radiation dose delivered to the organ based on the determined boundary and the calculated radiation dose.

22. A method as recited in claim 21, further comprising:
applying a weight factor to the average dose to calculate an effective dose to the organ.

23. A method as recited in claim 22, further comprising:
including one or more of the radiation dose, average radiation dose, or effective dose as part of a DICOM header for a CT image of the CT image dataset.

24. A method for computing a radiation dose delivered to a patient during a computed tomography (CT) scan of the patient, comprising:
generating a CT image dataset of a region of the patient;
determining one or more parameters relating to a x-ray source used to generate the CT image dataset;
calculating a primary x-ray dose distribution as a function of the CT image dataset and the one or more parameters relating to a x-ray source;
calculating a scattered x-ray dose distribution as a function of the primary x-ray dose distribution;
computing the radiation dose delivered to the patient based on the primary x-ray dose distribution and scattered x-ray dose distribution;
determining a boundary of an organ of the patient; and
calculating an average radiation dose delivered to the organ based on the determined boundary and the calculated radiation dose.

25. A method as recited in claim 24, further comprising:
calculating an average radiation dose for a specific CT image in the CT image dataset.

26. A method as recited in claim 25, further comprising:
including the average radiation dose for a specific CT image in a DICOM header of the CT image.

27. A method as recited in claim 24, further comprising:
applying a weight factor to the average dose to calculate an effective dose to the organ.

28. A method as recited in claim 24, wherein the average radiation dose is calculated for one or more of the following anatomical features: fetal dose, eye orbit dose, thyroid dose, bones, blood forming elements, spleen, liver, bladder, brain, gonads, breast, pancreas, kidney, adrenal.

29. A method as recited in claim 24, further comprising:
determining a boundary of a pathological entity of the patient; and
calculating an average radiation dose delivered to the pathological entity based on the determined boundary and the calculated radiation dose.

30. A method as recited in claim 24, further comprising:
determining a boundary of a man-made entity in the patient; and
calculating an average radiation dose delivered to the man-made entity based on the determined boundary and the calculated radiation dose.

31. A method as recited in claim 24, further comprising:
computing an external radiation dose delivered to the patient outside the scanned volume of the CT dataset by extrapolating the computed radiation dose to other regions of the patient's body.

* * * * *